United States Patent [19]

Breuer

[11] 3,715,030

[45] Feb. 6, 1973

[54] INTEGRATABLE HIGH SPEED REVERSIBLE SHIFT REGISTER

[75] Inventor: David R. Breuer, Malibu, Calif.

[73] Assignee: TRW Inc., Redondo Beach, Calif.

[22] Filed: Jan. 3, 1972

[21] Appl. No.: 214,902

[52] U.S. Cl..........307/221 R, 307/222 R, 307/224 R, 328/37, 328/44

[51] Int. Cl. .........................G11c 19/00, H03k 23/08

[58] Field of Search ........307/221, 222, 224; 328/37, 328/44

[56] References Cited

UNITED STATES PATENTS 3,268,740 8/1966 Rywak .............................307/221 R 3,280,344 10/1966 Ville ...............................307/224 R 3,573,754 4/1971 Merryman..........................328/37 X

*Primary Examiner*—John Zazworsky

*Attorney*—Daniel T. Anderson et al.

[57] ABSTRACT

In a shift register composed of a multiplicity of transistor flip-flops, information is clocked from one flip flop to the next one by interposing a resistor in series with a Schottky diode Schottky each clock input and the output circuit of one transistor pair and the same resistor in series with another Scottky diode between each clock input and the input circuit of the next transistor pair.

8 Claims, 2 Drawing Figures

PATENTED FEB 6 1973 3,715,030

SHEET 2 OF 2

INTEGRATABLE HIGH SPEED REVERSIBLE SHIFT REGISTER

BACKGROUND OF THE INVENTION

1. Field of the Invention

This invention relates to shift registers and particularly to an improved shift register circuit that features high speed with moderate power requirements, is reversible, and is readily implemented in integrated circuit form.

2. Background of the Invention

One type of shift register that has been used in high speed correlators of integrated circuit form uses multiple emitter transistors arranged in a master slave flip-flop configuration driven by a two-phase clock. Such a circuit is described in a paper by David Roy Breuer and James L. Buie, entitled "A High Speed, High Complexity LSI Correlator," presented at the 1970 Government Microcircuit Application Conference at Fort Monmouth, N.J., Oct. 6–8, 1970, and published the same date in the GOMAC DIGEST.

In the quest for ever increasing speed of operation, it was determined that several factors impose limitations in the operating speed of the above circuit. An important factor is that the use of double emitter transistors results in increased collector-base capacitance which in turn reduces the operating speed. Another factor is that the clock drive circuit must support all of the flip-flop currents and provide a well-defined low voltage. This requirement is difficult to meet at high speed. Yet another factor influencing speed is the low resistivity of the collector region of each transistor to support not only its own current but also the current of the next succeeding flip flop.

Apart from operating speed considerations, the prior disclosed circuit is not reversible and therefore lacks the versatility of a circuit that does have the ability of transferring data in either one of two opposite directions.

SUMMARY OF THE INVENTION

In accordance with the invention, the double emitter transistors are replaced by transistors having only a single emitter, and Schottky barrier diodes are interposed between the clock inputs and the transistors to clock the information from one flip flop to the next one. As will become apparent, the modified circuit succeeds in relieving the constraints affecting the operating speed as well as reducing power requirements, and is capable of shifting data either in one direction or in the opposite direction.

DESCRIPTION OF THE PREFERRED EMBODIMENTS

Figure 1:
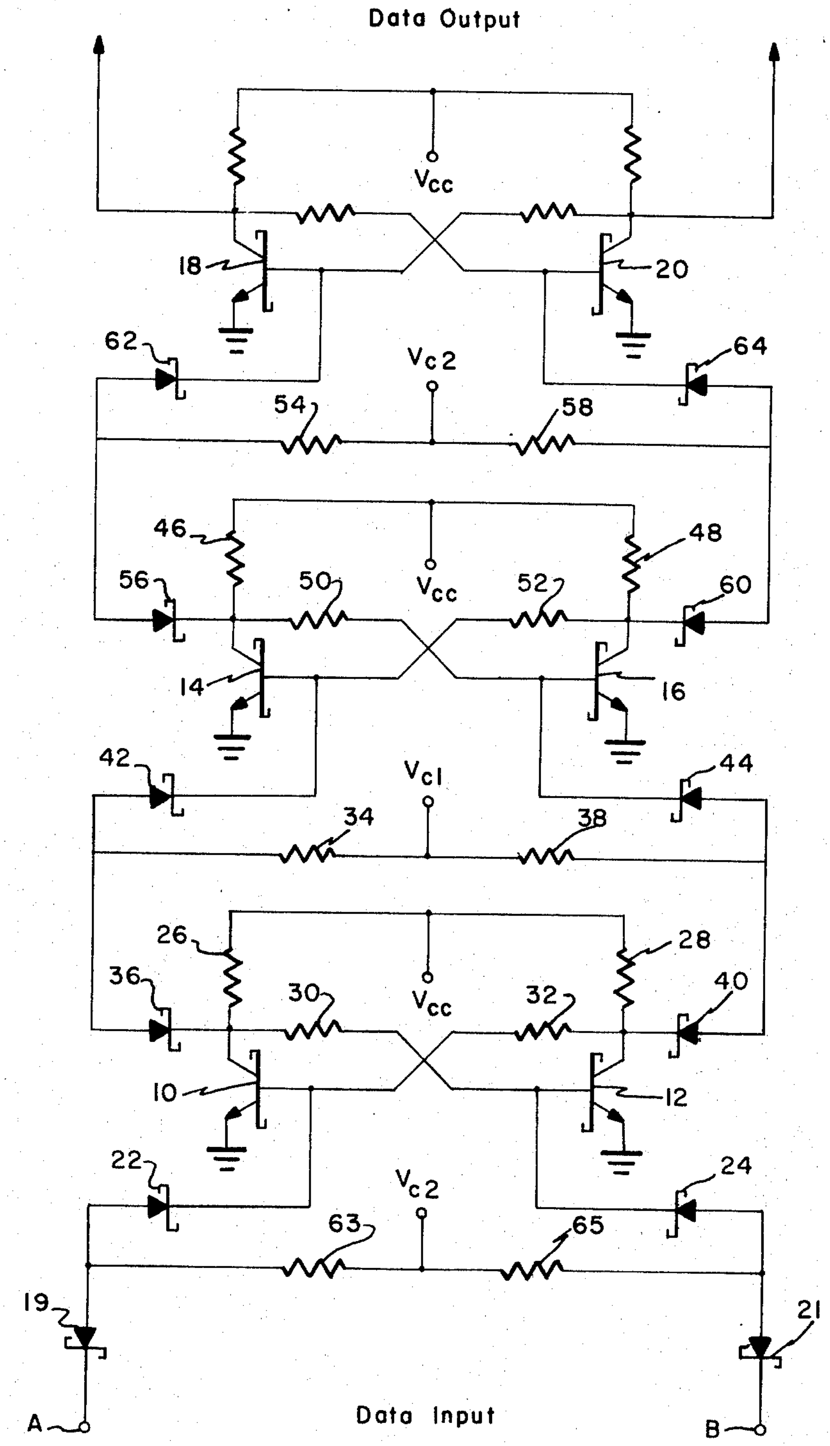
FIG. 1 is a schematic circuit of a shift register according to the invention capable of shifting data in one direction.

Referring now to FIG. 1, there is shown three stages of a shift register of master slave flip-flop configuration driven by a two-phase clock. Each flip-flop stage comprises a pair of bipolar transistors, identified as a first transistor pair 10 and 12, a second transistor pair 14 and 16, and a third transistor pair 18 and 20. Complementary logic is received at data input terminals A and B and fed first through Schottky diodes 19 and 21 and then through Schottky diodes 22 and 24 to the bases of the transistors 10 and 12 of the first flip flop. The emitter of the first transistor 10 is grounded and its collector is connected through a resistor 26 to a positive voltage supply $V_{cc}$. Similarly, the emitter of the second transistor 12 is grounded and its collector is connected through a resistor 28 to the voltage supply $V_{cc}$. A resistor 30 is connected between the collector of the first transistor 10 and the base of the second transistor 12, and a resistor 32 is connected between the collector of the second transistor 12 and the base of the first transistor 10.

A clock input $V_{cl}$ is coupled through a resistor 34 in series with a Schottky diode 36 to the collector of the first transistor 10. The clock input $V_{cl}$ is also coupled through a resistor 38 in series with a Schottky diode 40 to the collector of the second transistor 12. The clock input $V_{cl}$ is also coupled through the resistor 34 in series with a Schottky diode 42 to the base of the transistor 14 of the second flip flop, and through the resistor 38 in series with a Schottky diode 44 to the base of the other transistor 16 of the second flip flop.

The second and third flip flops are identical to the first, and the circuit components of only the second one will be specifically identified. The emitters of the transistors 14 and 16 are grounded. The collector of the transistor 14 is connected through a resistor 46 to the voltage supply $V_{cc}$, and the collector of the transistor 16 is connected through a resistor 48 to the voltage supply $V_{cc}$. A resistor 50 is connected between the collector of the transistor 14 and the base of the transistor 16, and a resistor 52 is connected between the collector of the transistor 16 and the base of the third transistor 14.

A second clock input $V_{c2}$ is coupled through a resistor 54 in series with a Schottky diode 56 to the collector of the transistor 14, and through a resistor 58 in series with a Schottky diode 60 to the collector of the transistor 16. The data outputs of the second flip flop, appearing at the junction of resistor 54 and Schottky diode 56 and the junction of resistor 58 and Schottky diode 60, are clocked by the second clock input $V_{c2}$ through Schottky diodes 62 and 64 to the inputs of the third flip flop. The second clock input $V_{c2}$ is also coupled to the bases of the transistors 10 and 12 of the first flip flop through resistors 63 and 65 and Schottky diodes 22 and 24 respectively. The third flip flop is identical in circuit arrangement to the first and second flip flops, and therefore requires no further description.

Since the three flip flop stages shown are part of a repeated iterative function, it is adequate to describe the transfer of data in only two stages. Bearing this in mind, the operation of the shift register of FIG. 1 is as follows. First let us assume that transistors 10, 14, and 18 are ON and transistors 12, 16 and 20 are OFF, and also that clock inputs $V_{c1}$ and $V_{c2}$ are low. Under these conditions, diodes 36 and 40, diodes 42 and 44, diodes 56 and 60, and diodes 62 and 64 are OFF, and each flip flop is holding its own state independent of one another. Then let us assume that $V_{c1}$ is raised to a high level. Since first transistor 10 is ON, the current through resistor 34 will flow through Schottky diode 36, rather than diode 42 because the potential at the collector of the transistor 10 in the first flip flop is lower than the potential at the base of the transistor 14 of the second flip flop. Diode 42 therefore remains cut off. Since the second transistor 12 is OFF, diode 40 will be cut off and the current through resistor 38 will flow through diode 44, resistor 50, and the collector of transistor 14, which is ON, until the base voltage of transistor 16 rises to $V_{be}$, the base-emitter forward conduction voltage of transistor 14. Transistor 16 then starts to conduct, thereby lowering its collector voltage and in turn removing the base drive of transistor 14. Transistor 14 then turns OFF and transistor 16 conducts heavily and turns ON. Now the clock input $V_{c1}$ can be lowered again and the second flip flop comprising transistors 14 and 16 will retain the state which was established by the first flip flop comprising the transistors 10 and 12.

Since the state of the second flip flop is inverted relative to the first flip flop, the data in the first flip flop has been transferred to the second flip flop. To transfer the data of the second flip flop to the third flip flop stage comprising transistors 18 and 20, the second clock input $V_{c2}$ is raised, while keeping the first clock input $V_{c1}$ low. When the second clock input $V_{c2}$ is raised, current will flow through resistor 54, Schottky diode 62 and transistor 18, which is ON, the current being blocked from Schottky diode 56 and transistor 14, which is OFF. Current will also flow through Schottky diode 60 and transistor 16, which is ON, and will be blocked from Schottky diode 64 and transistor 20, which is OFF. Thus, no change in state will have occurred in the third flip flop including transistors 18 and 20, and it will remain inverted relative to the second flip flop including transistors 14 and 16, when the second clock input $V_{c2}$ is lowered again. The fact that the third flip flop remains inverted relative to the second flip flop indicates that the data has been transferred from the second flip flop to the third flip flop. Thus in the circuit of FIG. 1, the data can be transferred in one direction from the first flip flop comprising transistors 10 and 12 to the second flip flop comprising transistors 14 and 16, and then to the third flip flop comprising transistors 18 and 20.

Figure 2:
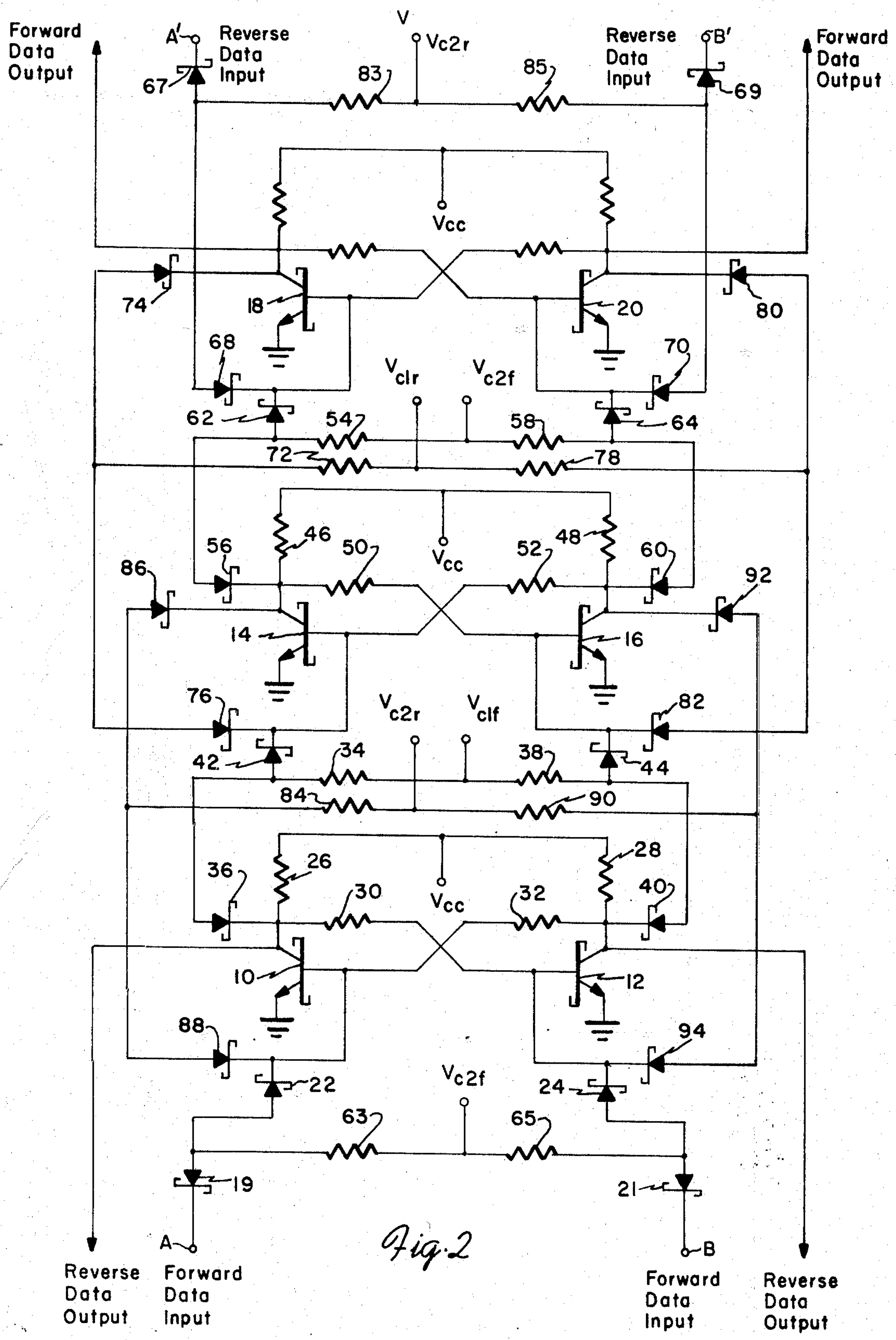
FIG. 2 is a schematic circuit of a reversible shift register according to the invention capable of shifting data in either one of two opposite directions.

The circuit of FIG. 1 can be modified so that it will be reversible, that is, capable of transferring data either in one direction or the other. This is accomplished in the circuit of FIG. 2 by connecting another set of Schottky diodes and resistor pairs that connect the flip flops in the reverse or opposite direction. In FIG. 2, like numerals are used to identify the parts that are common to the circuit of FIG. 1. In the circuit of FIG. 2, data input terminals A' and B' feed data to the bases of transistors 18 and 20 through Schottky diodes 67 and 68 and 69 and 70, respectively. A reverse clock input $V_{c1r}$ is fed through a resistor 72 and coupled to the transistor 18 through a Schottky diode 74 and to the transistor 14 through a Schottky diode 76. The reverse clock input $V_{c1r}$ is also fed through a resistor 78 and coupled to the transistor 20 through a Schottky diode 80 and to the transistor 16 through a Schottky diode 82. Similarly, a second reverse clock input $V_{c2r}$ is fed through a resistor 83 and Schottky diode 68 to transistor 18, and through a resistor 85 and Schottky diode 70 to transistor 20. The reverse clock input $V_{c2r}$ is also fed through a resistor 84 and coupled to the transistor 14 through a Schottky diode 86 and to the transistor 10 through a Schottky diode 88. The second clock input $V_{c2r}$ is also fed through a resistor 90 and coupled to the transistor 16 through a Schottky diode 92 and coupled to the transistor 12 through a Schottky diode 94. Thus in order to transfer data in the forward direction, clock pulses may be applied to forward clock inputs $V_{c1f}$ and $V_{c2f}$ in that order, whereas in order to transfer data in the reverse direction, clock pulses may be applied to reverse clock inputs $V_{c1r}$ and $V_{c2r}$ in that order.

The above-described shift register circuits are readily implemented in integrated circuit form. The Schottky diodes are easily formed by placing metal contacts on a high resistance N type region. For example, the diodes 36, 40, 56, 60 can be metal contacts placed over the collector regions of the corresponding transistors 10, 12, 14 and 16. Similarly, the other diodes 22, 24, 42, 44, 62, 64 can either be small metal contacts on a isolated region or on the end of the silicon cross coupling resistors 30, 32, 50, 52. All of the transistors are additionally provided with Schottky barrier diodes in shunt with the base and collector regions thereof to provide clamping, thereby preventing deep saturation and reducing transistor storage time.

Several advantages result from the circuit arrangements just described.

The clock drive circuit supports only the currents used to trigger the flip flops. This results in fewer clock drive circuits for a total correlator and/or a more simple design and lower power consumption than the multiple-emitter shift register.

The clock does not have any tight restrictions on the dc levels. It must merely have fast transitions through a threshold level.

The circuit will operate at lower power supply voltages for the same noise margins.

A flip flop transistor needs to support only its own current plus a gate current. This relieves the design constraint on the collector resistance of these devices and simultaneously improves the speed performance, since higher resistivity collector regions can be accommodated.

The flip flop transistors are single-emitter devices. Everything else being equal, therefore, the circuit will operate at higher speeds than the multiple emitter type due to the smaller collector-base junction.

Also, the turn-ON speed is controlled externally of the flip flop, by the amount of current pumped through the clock coupling resistors. This adds additional design freedom to increase the switching speeds, as compared to the multiple emitter type.

An extra advantage of the design, which could be a major item of usefulness, is the ease in which electrically alterable forward-reverse shifting can be accomplished in addition to parallel entry. With reference to FIG. 2, reverse shifting is obtained by adding another set of clock lines and Schottky diodes appropriately connected for reverse shifting. Forward or reverse shifting can be chosen by using either the $V_{c1f} - V_{c2f}$ clock lines or the $V_{c1r} - V_{c2r}$ clock lines. The extra diodes are obtained by simply adding small metal contacts on the appropriate semiconductor regions.

The schottky diodes are low capacitance, negligible storage time devices, and consequently lend themselves to high speed operation.

What is claimed is:

1. A shift register, comprising:

a. a plurality of flip flops, each having a pair of data input terminals and a pair of data output terminals;

b. a plurality of clock input terminals;

c. a first resistor connected from a clock input terminal to the anodes of two Schottky diodes, the cathode of one diode connected to a data output terminal of one flip flop and the cathode of the other diode connected to the data input terminal of the succeeding flip flop; and d. a second resistor connected from the same clock input terminal to the anodes of two additional Schottky diodes, the cathode of one diode connected to the complementary data output terminal of one flip flop and the cathode of the other diode connected to the complementary data input terminal of the succeeding flip flop.

2. The invention according to claim 1, wherein each of said flip flops comprises a pair of single emitter transistors.

3. The invention according to claim 2, wherein said single emitters are grounded.

4. The invention according to claim 3, wherein each of said transistors has a Schottky diode in shunt with the collector and base thereof.

5. A shift register, comprising:

a. a first group and a second group of transistor flip flops interconnected serially, with the flip flops of said first group alternating with the flip flops of said second group;

b. a first clock input terminal coupled to the output circuits of said first group of flip flops and to the input circuits of said second group of flip flops;

c. a second clock input terminal coupled to the output circuits of said second group of flip flops and to the input circuits of said first flip flops; and d. each of said clock input terminals being coupled to the respective input and output circuits of said two groups of flip flops by a resistor connected to two Schottky diodes.

6. The invention according to claim 5, and further including an additional pair of third and fourth clock input terminals coupled to said flip flops in the reverse sense relative to said first and second clock input terminals, whereby the direction of data transfer through said shift register is selectively reversible by applying clock signals either to said first and second clock input terminals in sequence, or to said third and fourth clock input terminals in sequence.

7. The invention according to claim 5, wherein each of said flip flops includes a pair of bipolar transistors each having a grounded single emitter, having their base input circuits and collector output circuits cross-connected by coupling resistors, and having their collector output circuits connected through collector load resistors to a power supply voltage.

8. The invention according to claim 7, wherein each of said transistors has a Schottky diode in shunt with the collector and base thereof.

* * * * *

UNITED STATES PATENT OFFICE
CERTIFICATE OF CORRECTION

Patent No. 3,715,030 Dated February 6, 1973

Inventor(s) David R. Breuer

It is certified that error appears in the above-identified patent and that said Letters Patent are hereby corrected as shown below:

Before "ABSTRACT OF THE DISCLOSURE" insert --The invention herein described was made in the course of or under a contract or subcontract thereunder, with the Department of the Navy.--

Cover page, in the ABSTRACT, line 4, delete "Schottky" second occurrence, and substitute --between--

Column 1, line 32, after "resistivity" insert --required--

Signed and sealed this 10th day of July 1973.

(SEAL)
Attest:

EDWARD M. FLETCHER, JR.
Attesting Officer

Rene Tegtmeyer
Acting Commissioner of Patents